Figure 1:
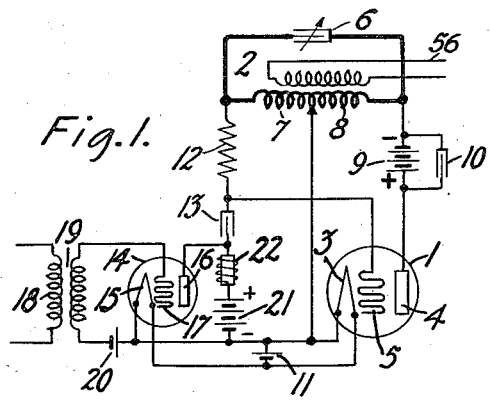

Dec. 19, 1922.

L. J. SIVIAN.
MODULATING METHOD AND SYSTEM.
FILED APR. 7, 1919.

1,439,134

Inventor:
Leon J. Sivian
by J.E. Roberts
Atty.

Patented Dec. 19, 1922.

1,439,134

UNITED STATES PATENT OFFICE.

LEON J. SIVIAN, OF EAST ORANGE, NEW JERSEY, ASSIGNOR TO WESTERN ELECTRIC COMPANY, INCORPORATED, OF NEW YORK, N. Y., A CORPORATION OF NEW YORK.

MODULATING METHOD AND SYSTEM.

Application filed April 7, 1919. Serial No. 288,122.

*To all whom it may concern:*

Be it known that I, LEON J. SIVIAN, a citizen of the United States, residing at East Orange, in the county of Essex, State of New Jersey, have invented certain new and useful Improvements in Modulating Methods and Systems, of which the following is a full, clear, concise, and exact description.

This invention relates to modulating methods and systems. More particularly, it relates to methods of modulation involving generation of oscillations having an amplitude which varies according to a desired wave form, and to systems operating in accordance with such methods.

An object of the invention is to enable the control of a high power oscillator, or a number of oscillators in parallel, by a modulating device carrying relatively small current.

Another object of the invention is to make it possible to use variable impedances having a convenient range of values as control elements for an oscillator.

A feature of the invention is the provision of a high impedance control element associated with the oscillatory circuit of an electronic oscillator in order to prevent variations in the frequency of the oscillations produced.

A further feature relates to an arrangement whereby the electromotive force impressed upon the input circuit of a thermionic device used as an oscillator, is directly under the control of a transmitting device.

A large class of thermionic oscillators is that in which an electron-discharge device having three elements, a cathode, an anode, and a grid or other impedance controlling element, is associated with an oscillatory circuit in such manner that a portion of the oscillatory circuit supplies a variable electromotive force to the input or grid-cathode circuit of the electron-discharge device, and the cathode-anode or space current circuit of the discharge device in turn impresses a variable electromotive force upon the oscillatory circuit. It is quite common to connect the input circuit of the electron-discharge device or tube to the terminals of a condenser in the oscillatory circuit or across part or all of an inductance in the oscillatory circuit. Moreover, the oscillatory circuit may be closed, or open as in the case of an ordinary tuned antenna, the antenna conductors and earth acting together as a capacity element. The electromotive force impressed by the oscillatory circuit upon the input circuit of the tube is that which normally exists between the points in the oscillatory circuit to which the grid and cathode are connected. According to the present invention, a variable coupling is employed between the oscillatory circuit and the input circuit of the electron-discharge device. A high impedance shunt path is connected to the two points in the oscillatory circuit to which the input circuit elements are ordinarily connected, and the input circuit elements are connected to two points in this impedance shunt path. The relative values of the portion of the impedance between the points of connection of the input circuit and the portion outside of these points can be varied by signal or control elements, thus varying the fraction of the oscillatory electromotive force impressed upon the input circuit of the oscillator tube, and the phase of this impressed electromotive force. The value of the space current of the tube is controlled by that of the electromotive force impressed on the input circuit, and the amplitude of the oscillations produced is determined largely by the value of the space current.

Figure 3:
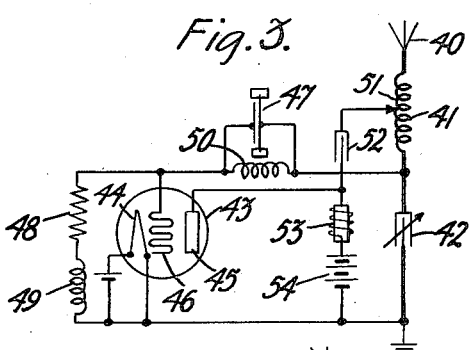
Figure 2:
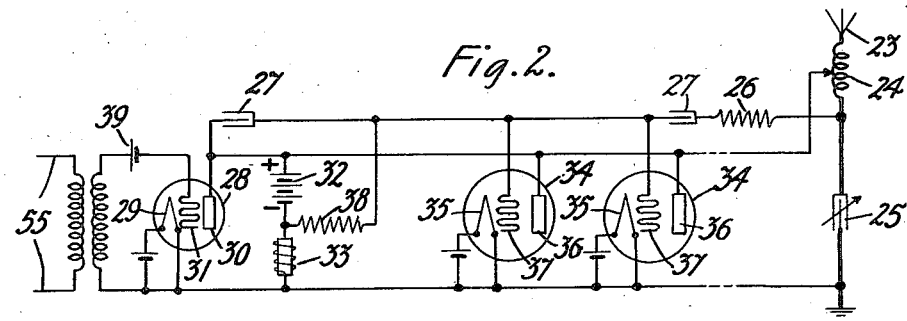
Figure 4:
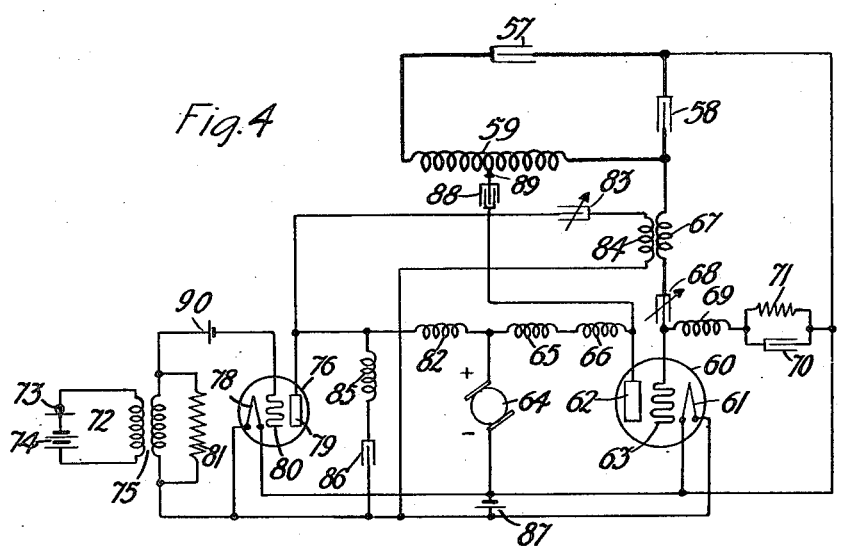

In the drawing, Fig. 1 illustrates diagrammatically a signaling system in which an oscillator produces oscillations of an amplitude determined by the value of a thermionic impedance, and supplies oscillating energy to a transmission circuit; Fig. 2 illustrates a modification of the oscillator arrangement of Fig. 1 applied to a radio system; Fig. 3 illustrates a modification of the circuits of Fig. 2 in which the thermionic control impedance is replaced by a condenser transmitter; and Fig. 4 illustrates another modification in which the thermionic control impedance is indirectly introduced into the control circuit.

Referring to Fig. 1, an oscillator comprises a three-element thermionic discharge device or tube 1, and an oscillatory circuit 2 and, as also in the case of the remaining figures of the drawing, the oscillatory circuit is indicated by heavy lines. Tube 1 is preferably highly evacuated and contains a hot filament 3 or other source of electrons, an anode or plate 4 and an impedance controlling element or grid 5. The closed oscillatory circuit 2 comprises a variable capacity element 6 and inductances 7 and 8 which may be inductively related to each other, although such relationship is not essential. Cathode 3 is connected to the common terminal of inductances 7 and 8, and the space current path for tube 1 may be traced by way of inductance 8, space current source 9, back to anode 4. Capacity element 10 in shunt to source 9 serves as a low impedance path for high frequency oscillations and a source 11 supplies heating current to cathode 3. In shunt to inductance 7 is a high impedance path comprising a high resistance 12, a capacity element 13 and thermionic impedance element 14 in series. The input circuit elements 3 and 5 of oscillator tube 1 are connected to the high impedance path so as to be subjected to the electromotive force across the thermionic impedance element 14 and capacity 13. The electromotive force across the element 14 is a fraction of the electromotive force across the inductance 7 depending primarily upon the ratio of the impedance of the element 14 to that of the entire high impedance path 12, 13 and 14. Element 14 comprises a container, preferably highly evacuated, having a cathode or electron-emitting filament 15, an anode or plate 16 and an impedance controlling element or grid 17. A signal or controlling current circuit 18 is connected by transformer 19 to the input circuit of element 14 which includes the secondary winding of the transformer and a polarizing source 20 and terminates in cathode 15 and grid 17. The space current circuit of element 14 may be traced from cathode 15 through space current source 21 and choke coil 22 to plate 16. Filaments 3 and 15 are preferably heated by a common source 11 of heating current, and condenser 13 prevents the source 21 from charging grid 5 positively with respect to cathode 3.

In operation the oscillatory circuit 2 in conjunction with thermionic device 1 serves as a source of oscillations of a frequency determined principally by the constants of the oscillatory circuit, and of an amplitude determined principally by the electromotive force impressed upon the input circuit of the thermionic device 1. If, during the non-signal operation, the amplitude of the oscillations in the oscillatory circuit attains a certain value, the electromotive force across the inductance 7 is of a corresponding value and the fraction of that electromotive force impressed upon the input circuit of tube 1 remains constant. When signal or control currents traverse the circuit 18, the impedance of element 14 changes and in consequence of this change of impedance the electromotive force impressed upon the input circuit of tube 1 varies, changing the value of the space current and the amplitude of the oscillations produced. Consequently, load or work circuit 56 inductively connected to inductances 7 and 8 of the oscillatory circuit will be supplied with oscillatory current varying in amplitude as determined by the current in circuit 18. It is therefore possible to supply signaling currents or impulses of any form, or controlling currents or impulses to circuit 18, and to transmit to the work or load circuit, which may be a control or signaling circuit or an antenna, oscillations correspondingly varying in amplitude.

In the circuit arrangement of Fig. 2, an oscillatory circuit comprises an antenna 23, inductance 24 and variable capacity 25 in series. A high impedance path comprising a high resistance 26, condensers 27 and a thermionic impedance device 28, similar to element 14 of Fig. 1 and having a cathode 29, an anode 30 and an impedance controlling element 31, is bridged across the capacity element 25. A line 55 corresponding to circuit 18 of Fig. 1 is connected to the input circuit of device 28, the output or space current circuit of which includes a source 32 of space current and a radio choke coil 33.

A plurality of tubes 34 connected in parallel and each including a cathode 35, an anode 36 and an impedance controlling element 37, constitute with the oscillatory circuit, a source of oscillations, the frequency of which is principally determined by the tuning of the oscillatory circuit and the amplitude of which is primarily dependent upon the electromotive force impressed upon the common input circuit of the tubes. The space current circuit of each tube 34 can be traced from cathode 35 through the radio choke coil 33 and space current source 32 to anode 36. The impedance of the thermionic device 28 is controlled by the electromotive force impressed upon its input circuit in consequence of current variations in line 55. Normally, the electromotive force across the capacity 25 of the oscillatory circuit is impressed upon the path 26, 27 and 28, in shunt thereto, and a definite part of this electromotive force is correspondingly impressed across the input circuit of tubes 34. When the impedance of tube 28 varies, the electromotive force thereacross likewise varies, as does also that impressed upon the input circuit of tubes 34. The space current of the oscillator tubes and the amplitude of the oscillations produced thereby is therefore dependent upon the value of the variation currents of line 55. In order to prevent a charge from becoming trapped on grids 37 of oscillator tubes 34, a high resistance leak path 38 is arranged to connect the grids to the negative terminal of source 32. This permits a slow leak to the filaments. A current source 39 is placed in the input circuit of the thermionic impedance element 28 and is so poled as to tend to prevent flow of space current in its circuit. Consequently, the energy of the variation current in circuit 55 is chiefly expended in varying the potential of grid 31 with respect to filament 29 and not in setting up a space current in the input circuit.

In the arrangement of Fig. 3, an oscillatory circuit comprises an antenna 40, inductance 41 and variable capacity 42, as in Fig. 2. Oscillator element 43 corresponds in every respect to one of the tubes 34 of Fig. 2, and includes a cathode 44, an anode 45 and an impedance varying element 46. Shunted around variable condenser 42 of the oscillatory circuit is a high impedance path comprising a condenser transmitter 47, high resistance 48 and inductance 49 in series. In shunt to the transmitter 47 is a reactance element 50. Cathode 44 of oscillator element 43 and inductance 49 are connected to the same terminal of condenser 42, and grid 46 is connected to a point in the high impedance path between transmitter 47 and resistance 48. Anode 45 is connected by a variable tap 51 to inductance 41 of the oscillatory circuit through a condenser 52 which serves to prevent the space current source of the tube 43 from charging the grid positively with respect to cathode 44. The space current circuit of tube 43 includes a radio choke coil 53 and a space current source 54.

The operation of this system is essentially like that of the system illustrated in Fig. 2. When sound waves act on transmitter 47, its reactance is varied and the electromotive force impressed on the grid-filament circuit of the oscillator tube is varied in consequence of this variation in reactance. The loop circuit, including transmitter 47 and reactance 50, is preferably tuned to a slightly different frequency than that of the circuit 40, 41, 42. The joint reactance of transmitter 47 and inductance 50 is accordingly of large value and changes rapidly with variations of the reactance of either. Consequently a small variation in the reactance of the transmitter produces relatively large changes in this joint reactance, thus increasing the effectiveness of the transmitter. Resistance 48 is of such an order as to act as a grid leak, permitting only very small space current in the grid filament circuit. In other respects, the operation of this system is similar to that of the system of Fig. 2.

In Fig. 4, illustrating an arrangement wherein the thermionic impedance element is indirectly associated with the input circuit of the oscillator, the oscillation circuit comprises capacity elements 57 and 58 and inductance 59. An oscillator tube 60, which may be taken as representative of a plurality of tubes having their input circuits connected in parallel and their output circuits also connected in parallel in the manner of tubes 34 of Fig. 2, has a cathode 61, an anode 62 and an impedance controlling element 63. The space current circuit of this tube includes a source 64, a low frequency choke 65, and a high frequency retard 66. Capacity element 58 is shunted by a high impedance path comprising impedance element 67, variable capacity 68, inductance 69, and capacity 70 in series. Cathode 61 of the oscillator tube is connected to the common terminals of capacity elements 70 and 58, and grid 63 is connected to the point between capacity element 68 and inductance 69. A high resistance 71 is shunted across capacity element 70 to serve as a leak path for charges trapped on the gird. It will, therefore, be evident that the input electromotive force impressed upon tube 60 will be dependent upon the impedance relation of the substantially constant impedance 69, 70, 71 to that of the entire high impedance path 67, 68, 69, 70, 71.

A low frequency line 72 is shown as including a microphone 73 and current source 74, although it is to be understood that this is merely representative of any variation current line. Line 72 is connected by transformer 75 to the input circuit of thermionic impedance element 76, which has the usual cathode 78, anode 79 and grid or impedance control element 80. The secondary winding of transformer 75 is shunted by a resistance element 81 to improve the transmission characteristics of the circuit in well-known manner. The space current circuit of thermionic impedance element 76 includes source 64 and high frequency retard 82. Connected to the space current electrodes of tube 76 are two alternating current paths, the one comprising variable capacity 83 and transformer primary winding 84, the other comprising high frequency retard 85 and large capacity 86. A common source 87 serves to supply heating currents to both cathodes 61 and 78.

The connection from the plate 62 of the oscillator tube to the oscillatory circuit is by way of large capacity element 88 and a variable tap connection 89. Capacity element 88 serves to keep the unidirectional potential from being impressed upon the inductance 59 of the oscillatory circuit. A polarizing source 90 may be employed in the input circuit of tube 76 to fix the normal impedance of this tube at a suitable value.

The operation of the arrangement illustrated in Fig. 4 may now be explained. Oscillatory circuit 57, 58, 59 in conjunction with thermionic device 60 constitutes an oscillator. As has been previously explained, capacity element 58 of the oscillatory circuit is shunted by a high impedance path 67, 68, 69, 70, and across a substantially fixed impedance portion 69, 70 of this path the input circuit of tube 60 is connected. The remaining portion of this path includes transformer winding 67, the effective impedance of which is dependent upon the impedance connected to the terminals of transformer winding 84, to which it is coupled. Winding 84, together with capacity 83 and tube 76, constitutes a path of variable impedance. By properly proportioning the values of elements 83 and 84, they may be approximately tuned to the frequency of the oscillations generated. In other words, the series reactance of these two elements may be made approximately zero. The effective impedance introduced into winding 67 by winding 84 coupled thereto will therefore be largely determined by the impedance of tube 76, and this varies in accordance with currents in line 72. It is, therefore, possible to indirectly vary the effective impedance of winding 67 and to thus vary the electromotive force impressed upon the input circuit of oscillator tube 60.

The shunt path 85, 86 is approximately tuned to the frequency of the oscillations to be generated. This path is not an essential feature of the arrangement but is desirable in the case where source 64 is a generator having large inductance. Because of the fact that high frequency retard elements are usually made without iron cores, they may pass low frequency variations without difficulty. Hence retard 82 may present little impedance to current variations of the frequency existing in line 72. If, however, source 64 be of large inductance, it may tend to keep the space current of tube 76 supplied by source 64 substantially constant, and thus to function as a very high alternating current impedance into which tube 76 must work. Circuit 85, 86 furnishes an output impedance for tube 76 of a value satisfactory for efficient operation of this tube. Viewed from another standpoint, elements 83, 84, 85 and 86 may constitute a closed circuit, approximately tuned to the high frequency oscillations, which introduces small effective impedance into winding 67 when coupled thereto. By varying the impedance of tube 76, and consequently the tuning of the circuit 83, 84, 85, 86 connected thereto, the effective impedance introduced into winding 67 is varied.

When certain types of tubes are used as oscillatiton generators, it is found that the average space current falls as the intensity of the oscillations increases. Since, as previously explained, a high frequency retard may not act as a low frequency choke, the high frequency retard 66 may have no substantial effect in holding up the value of the space current of tube 60, should this current tend to fall. Low frequency choke 65 is therefore employed with tubes of this particular characteristic to prevent the drop in average space current during the oscillating action.

In other respects the operation of this particular modification is like that of the forms previously described. When speech currents or other variable currents traverse line 72, varying electromotive forces are set up in the input circuit of element 76, correspondingly changing its impedance. In consequence of this, the effective impedance of element 67 is indirectly varied, thus changing the electromotive force applied to the input circuit of the oscillator tube 60, and consequently varying the intensity of the oscillations generated.

In each of the foregoing systems, an element of the oscillatory circuit is shunted by a high impedance path comprising a fixed impedance and a variable impedance in series therewith. It should be understood that any element or number of elements of the main oscillatory circuit may be so shunted and that the impedances of the shunt may be of any character, provided that its net value is sufficiently large to prevent shunting a considerable portion of the oscillatory current or changing the frequency of the oscillatory circuit and its closely associated elements. In one aspect, the high impedance path operates as a potentiometer to permit varying portions of an alternating electromotive force impressed upon it to be applied to the input circuit of the oscillator tube. Since the effect of variations of impedance of a portion of this high impedance path is to change the potential on the grid of the oscillator tube either toward that of the one terminal of the impedance path or toward that of the other, the action may also be considered as electrically equivalent to shifting the grid connection along the oscillatory circuit, or, in other words, varying the effective coupling of the oscillatory circuit to the input circuit of the oscillator tube.

Although in Figs. 1 and 2 the input circuit of the oscillator tube is shown connected to the variable impedance and in Figs. 3 and 4 to the fixed impedance, it should be understood that either arrangement may be used in all four arrangements as desired.

It should be understood that in each of the arrangements described, a number of oscillator tubes in parallel may be used.

Although four distinct circuit arrangements have been illustrated and described, the invention is not limited to any of these circuits as a whole or to their specific details, but only by the scope of the appended claims. It is to be understood that although the invention has been illustrated and described in connection with means for modulating high frequency currents, it is in certain aspects not limited thereto.

What is claimed is:

1. The method of producing a wave modulated in amplitude in accordance with a lower frequency wave by an electron discharge device having an input circuit and an output circuit coupled thereto through an oscillatory circuit which comprises changing the effective coupling between said oscillatory circuit and said input circuit in accordance with the wave of lower frequency for the purpose of varying the instantaneous value of the energy of the output circuit.

2. A potentiometer arrangement comprising an alternating current circuit, a reactance element in said circuit, a high impedance path in shunt to said reactance, said high impedance path including a fixed resistance and a variable impedance in series therewith, a supply circuit connected to two points in said high impedance path, whereby a variable electromotive force may be impressed from said alternating current circuit upon said supply circuit, and means for varying said variable impedance in accordance with control waves.

3. An oscillatory circuit including a reactance element, a variable impedance in shunt to said reactance element, an electron discharge device having an impedance controlling element connected to said impedance and a cathode and an anode each connected to said oscillatory circuit, and means for varying said impedance in accordance with control waves.

4. An oscillatory circuit, an impedance path in shunt to an element of said circuit so as to be subjected to the same electromotive force as said element, an electron discharge device having an input circuit, means for impressing upon said input circuit a portion of said electromotive force varying in accordance with signals, and means for setting up oscillations in the said circuit thereby producing an electromotive force across said element.

5. An oscillatory circuit, an electron relay having input and output circuits associated with said oscillatory circuit, means for applying to said input circuit a portion of the electromotive force existing across an element of said oscillatory circuit, and means for varying the relative amount of said portion in accordance with signals.

6. In combination, an oscillatory circuit, a high impedance path in shunt to a portion of said circuit, an electron discharge device, a cathode, an anode, and an impedance controlling element for said device, said cathode and anode each being connected to points in said oscillatory circuit, said high impedance path comprising a fixed impedance and a variable impedance in series, and a common point of connection for said fixed impedance, said variable impedance and said impedance controlling element.

7. In combination, an oscillator comprising an oscillatory circuit, a high impedance path shunting a portion of said circuit, said path comprising a substantially fixed impedance and a variable impedance, means for indirectly varying the value of said variable impedance, and a vacuum electric discharge device having its output circuit connected to said oscillatory circuit, and its input circuit connected to points in said high impedance path.

8. In combination, an oscillator comprising an oscillatory circuit, a high impedance path shunting a portion of said circuit, said path comprising a substantially fixed impedance and a variable impedance, means comprising a thermionic device connected to said variable impedance to vary its magnitude, and a vacuum electric discharge device having its output circuit connected to said oscillatory circuit and its input circuit connected to points in said high impedance path.

9. A thermionic oscillation generating system for producing modulated oscillations comprising a space discharge device having a cathode, an anode and an impedance controlling element, an input impedance element in circuit between said impedance controlling element and one of said electrodes, a path opaque to direct current shunted across at least a part of said input impedance element, and a variable signal controlled impedance effective to change the alternating current impedance of said path.

10. The method of operating an electron discharge device having an input circuit between a control element and another element of said device which consists in varying the impedance of the input circuit to alternating current in accordance with signals, and maintaining the direct current impedance thereof substantially constant.

11. An electron discharge device having an input impedance element, means for variably impeding alternating current transmitted to said element, and means for substantially invariably impeding uni-directional current flowing in a circuit including said element.

12. The method of modulating by means of an electron discharge device the current produced in the output circuit of another electron discharge device which consists in utilizing the first named discharge device as a variable impedance for alternating current in the input circuit of the second named discharge device, and substantially invariably impeding uni-directional current flowing in the input circuit of said second named discharge device.

In witness whereof, I hereunto subscribe my name.

LEON J. SIVIAN.